(«12») United States Patent
Arya et al.

(10) Patent No.: US 10,387,728 B2
(45) Date of Patent: Aug. 20, 2019

(54) MAPPING WIND TURBINES AND PREDICTING WAKE EFFECTS USING SATELLITE IMAGERY DATA

(71) Applicant: International Business Machines Corporation, Armonk, NY (US)

(72) Inventors: Vijay Arya, Bangalore (IN); Sambaran Bandyopadhyay, Bangalore (IN); Akash Kumar Panda, Kanpur (IN)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 15/598,736

(22) Filed: May 18, 2017

(65) Prior Publication Data

US 2018/0336408 A1 Nov. 22, 2018

(51) Int. Cl.
*G06K 9/00* (2006.01)
*G06N 5/04* (2006.01)
*G06T 7/11* (2017.01)
*F03D 17/00* (2016.01)
*G06N 20/00* (2019.01)
*F03D 7/04* (2006.01)

(52) U.S. Cl.
CPC ......... *G06K 9/00637* (2013.01); *F03D 7/048* (2013.01); *F03D 17/00* (2016.05); *G06N 5/04* (2013.01); *G06N 20/00* (2019.01); *G06T 7/11* (2017.01); *F05B 2270/80* (2013.01); *G06T 2207/10032* (2013.01)

(58) Field of Classification Search
CPC ....... G06K 9/00637; F03D 7/06; F03D 17/00; F03D 7/047; G06T 7/11; G06T 2207/10032; G06N 99/005; G06N 5/04
See application file for complete search history.

(56) References Cited

U.S. PATENT DOCUMENTS

| 8,655,070 B1 | 2/2014 | Yang et al. |
| 9,275,297 B2 | 3/2016 | Tabb |
| 2005/0192779 A1 | 9/2005 | Mertins et al. |
| 2005/0192827 A1* | 9/2005 | Mertins ..................... F03D 7/06 705/7.34 |

(Continued)

FOREIGN PATENT DOCUMENTS

| CN | 104636608 | * | 5/2015 |
| CN | 104833336 A | | 8/2015 |

(Continued)

*Primary Examiner* — Qian Yang
(74) *Attorney, Agent, or Firm* — Ryan, Mason & Lewis, LLP

(57) ABSTRACT

Methods, systems, and computer program products for mapping wind turbines and predicting wake effects using satellite imagery data are provided herein. A computer-implemented method includes analyzing one or more satellite images depicting one or more portions of a pre-determined geographic area; detecting a group of one or more wind turbines in the pre-determined geographic area based on the analyzing step and one or more additional items of data; inferring geographic coordinates of each of the detected wind turbines; predicting a wake effect impacting one or more of the detected wind turbines based on the inferred geographic coordinates of each of the detected wind turbines and forecasted weather data; and outputting the predicted wake effect to at least one user.

20 Claims, 5 Drawing Sheets

(56) References Cited

U.S. PATENT DOCUMENTS

2009/0295165 A1\* 12/2009 Giguere .................. G06Q 10/06
  290/55
2011/0166787 A1    7/2011 Tencer et al.
2015/0278405 A1   10/2015 Andersen et al.
2018/0003161 A1\*  1/2018 Michini .................. F03D 17/00
2018/0181129 A1\*  6/2018 Li ........................ G05D 1/0088

FOREIGN PATENT DOCUMENTS

| CN | 105701558 | \* | 6/2016 |
| WO | 2004077068 A1 | | 9/2004 |
| WO | 2011160634 A1 | | 12/2011 |

\* cited by examiner

MAPPING WIND TURBINES AND PREDICTING WAKE EFFECTS USING SATELLITE IMAGERY DATA

FIELD

The present application generally relates to information technology, and, more particularly, to weather-related data management.

BACKGROUND

Many asset-intensive industries have different types of assets in the field, commonly occurring in groups and/or clusters. Additionally, such industries are commonly challenged with inaccurate and/or un-mapped geo-locations of such groups and/or clusters of assets. By way of example, accurately determining the locations of wind turbines and wind farms, solar panels and solar farms, transmission and distribution poles, etc., can present challenges.

SUMMARY

In one embodiment of the present invention, techniques for mapping wind turbines and predicting wake effects using satellite imagery data are provided. An exemplary computer-implemented method can include analyzing one or more satellite images depicting one or more portions of a pre-determined geographic area; detecting a group of one or more wind turbines in the pre-determined geographic area based on the analyzing step and one or more additional items of data; inferring geographic coordinates of each of the detected wind turbines; predicting a wake effect impacting one or more of the detected wind turbines based on the inferred geographic coordinates of each of the detected wind turbines and forecasted weather data; and outputting the predicted wake effect to at least one user.

In another embodiment of the invention, an exemplary computer-implemented method can include detecting a shadow corresponding to each of the detected wind turbines based on the analyzing step; inferring geographic coordinates of (i) each of the detected wind turbines and (ii) each of the detected shadows; and predicting a wake effect impacting one or more of the detected wind turbines based on (i) the inferred geographic coordinates of (a) each of the detected wind turbines and (b) each of the detected shadows, and (ii) forecasted weather data.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
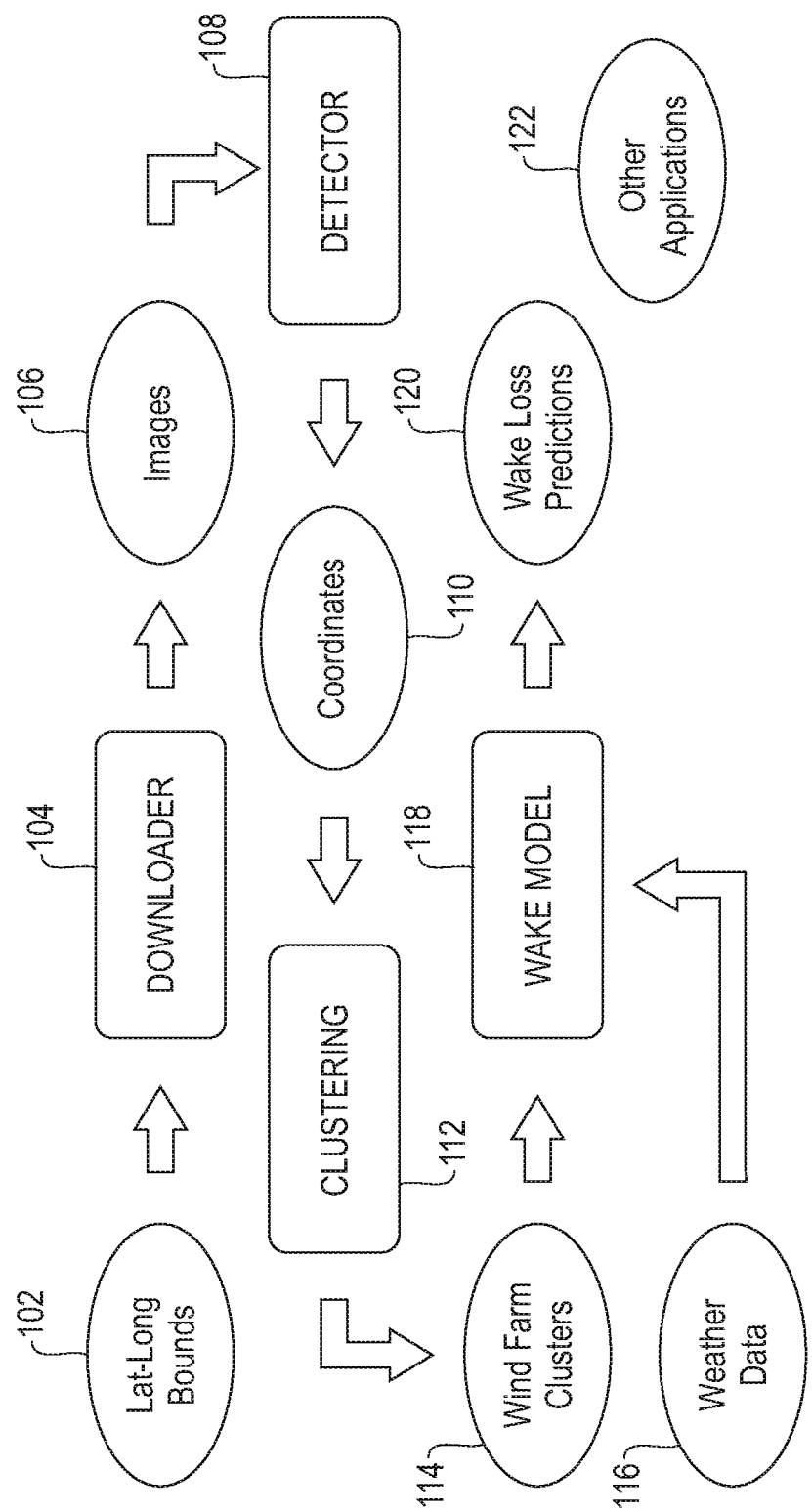
FIG. 1 is a diagram illustrating system architecture, according to an exemplary embodiment of the invention.

As described herein, an embodiment of the present invention includes mapping wind turbines and predicting wake effects using satellite imagery data. As used herein, a "wake effect" refers to the impact on energy production for a given wind farm, wherein such impact is a consequence of changes in wind speed caused as a result of the functioning of other turbines (within that wind farm and/or from across one or more wind farms).

At least one embodiment of the invention includes detecting clustered assets such as wind turbines (and/or wind farms), solar panels (and/or solar farms), electrical transmission/distribution poles, etc., using satellite imagery. Such an embodiment can include utilizing data obtained from satellite images recorded at different times, weather data, land use data, and/or street map data for detecting the locations of clustered assets. One or more embodiments of the invention can include using machine learning techniques on satellite images of shadows of such assets (such as wind turbines) to identify the latitude and longitude coordinates of the assets. In such an embodiment, shadows can help the machine learning algorithms determine if the object under consideration is a wind turbine, and hence, help to determine the location of the wind turbine. Additionally, one or more embodiments of the invention can include automatically learning, based on analysis of satellite image data, one or more common arrangements of clustered assets (such as wind turbines), for example, to improve the precision of detecting locations of all existing turbines in a given wind farm.

As further detailed herein, at least one embodiment of the invention can also include mapping the clustered assets against historical satellite images, weather data, street map data, land use data, and/or night light data, and forecasting the location of one or more future wind turbines and/or wind farms in a given region, for providing improved power output. Also, one or more embodiments of the invention can include learning one or more common errors and/or improper arrangements of turbines in a farm. An arrangement can be deemed improper, for example, if it does not minimize the overall wake effect in the farm. Such information can subsequently be used, for example, for planning and/or yield optimization. Additionally, in one or more embodiments of the invention, satellite-based mapping can be used to verify and/or correct errors in crowd-sourced information. For example, such an embodiment can include acquiring the locations of turbines using crowd-sourcing techniques.

Also, commonly, operators do not have extensive knowledge pertaining to the renewable energy farms of other operators, even in situations wherein the multiple operators are part of a single, larger farm. In connection with one or more embodiments of the invention, mapping clustered assets against historical data can facilitate an operator in determining and/or identifying wake effects from turbines in nearby farms, which can be taken into account for forecasting and/or yield optimization.

FIG. 1 is a diagram illustrating system architecture, according to an embodiment of the invention. By way of illustration, FIG. 1 depicts a downloader component 104, a detector component 108, a clustering component 112, and a wake model component 118. Specifically, as depicted in FIG. 1, latitude-longitude bounds 102 are provided as input to the downloader component 104, which downloads images 106 that correspond to the provided bounds 102. The downloaded images 106 are then provided as input to the detector component 108, which analyzes the images 106 and generates geographic coordinates 110 for multiple assets (such as wind turbines). By way of example, based on detected turbines within each of one or more satellite images, the detector 108 can infer latitude and longitude values for each of the detected turbines.

The coordinates 110 are output to the clustering component 112, which, based on the coordinates 110, determines and/or identifies one or more asset (wind farm) clusters 114. It is noted that turbines are generally found in clusters, not in complete isolation. The asset clusters 114, along with one or more items of weather data 116 (such as wind speed data, wind direction data, etc.), are provided as input to the wake model component 118. Based on such inputs, the wake model component 118 generates wake loss predictions 120, which can subsequently be utilized by one or more other applications 122 (as further described herein). To generate such wake loss predictions 120, the model 118 can estimate the amount of wake, which can further provide a loss in energy.

With respect to object detection, existing techniques involve training models using test images. Such a technique can include, for example, manually selecting turbines images for training, and using the trained model to detect turbines. However, existing trained models commonly yield poor precision and recall.

In contrast with such disadvantageous approaches, detectors (such as component 108 in FIG. 1) utilized via one or more embodiments of the invention overcome such precision and recall challenges. By way of example, in at least one embodiment of the invention, detector 108 can leverage the shadow of a turbine (in an image) as a feature. Accordingly, such an embodiment includes using images of both the turbine's shadow as well as the actual turbine itself for training and detection. As such, two separate images per turbine are utilized, along with respective weights for the image of the turbine and the image of the turbine's shadow. Such weights can be determined based on training data.

Additionally, in at least one embodiment of the invention, detector 108 can filter satellite images based on time. Given a list of satellite images recorded at different times of day for each location, such an embodiment can include filtering images recorded further away in time from the solar noon, so as to obtain images containing more prominent shadows.

Further, in at least one embodiment of the invention, detector 108 can filter map regions. Detectors can yield errors depending on the background where detection is applied. For example, when images of densely-populated city areas are scanned to retrieve turbine objects, errors can arise. Accordingly, one or more embodiments of the invention can include filtering map regions with high wind speeds (according to a wind resource map of the location and/or meteorological data), and using these regions in the search for turbines. Such an embodiment can include segmenting the map based on land use, and eliminating from consideration areas with a low likelihood of wind turbines.

In at least one additional embodiment of the invention, detector 108 can leverage spatial arrangements of turbines within a farm to improve accuracy. Such an embodiment can include clustering detected turbines and recognizing one or more patterns of wind turbine arrangement within farm clusters. Such patterns can include patterns of the arrangement of turbines, which can be learned from training data. Further, such an embodiment can include identifying if one or more anomalies exist in the patterns in terms of one or more missing turbines. Subsequently, model parameters can be constrained, and detector 108 can be re-run (on the relevant images) to identify one or more missing turbines. Such an embodiment can also include using one or more street maps, if available, to assist in identifying one or more turbine patterns.

Additionally, in at least one embodiment of the invention, detector 108 can leverage the likelihood that an isolated turbine is rare, in order to identify one or more wind farms. In such an embodiment, the detection of a wind farm can begin by using a classifier that has high precision so that the classifier can correctly detect at least one wind turbine from the farm. Once the farm is detected, such an embodiment can include using a classifier with high recall around the region of the detected turbine, to detect all of the turbines within the farm.

As detailed herein, using detected wind turbines along with forecasted wind data, one or more embodiments of the invention (via wake model 118, for example) can include identifying pairs of turbines which are impacted with wake at different times. Additionally, detected turbines in historical images, weather data, satellite and street map data, and/or night light data can be used to forecast locations of future wind farm locations. Upon determining the locations of the existing farms, one or more embodiments of the invention can include determining the relation of the farms with different weather conditions, landscapes, etc., and subsequently forecasting and/or suggesting the locations of future farms based on analogous information. Also, one or more embodiments of the invention can include using detected turbines along with weather data to provide a forecast of power output of a given wind farm. Using weather data (such as wind speed, wind direction, etc.) and the wake effect estimated from the model, the net output of a farm can be predicted using machine learning.

Further, at least one embodiment of the invention can be implemented to detect other assets (that is, assets separate from wind turbines). Other asset classes occurring in groups and/or clusters can include electrical transmission poles, solar panels, solar farms, etc. Detecting transmission and distribution poles from satellite images can be utilized to obtain the exact span of an electrical network and/or to infer electrification in different regions. Detection of solar farms and/or panels can be utilized to study the status of renewable energy in a region, identify one or more locations for installations of farms, determine the scope of solar generation, etc. In one or more embodiments of the invention, one or more customizations can be implemented depending on the exact use case. For example, in detecting solar farms, such an embodiment can include searching for places with high solar irradiance rather than high wind speed. Roof-top solar panels in a city area, for instance, can be searched using economic condition as a criteria.

Figure 2:
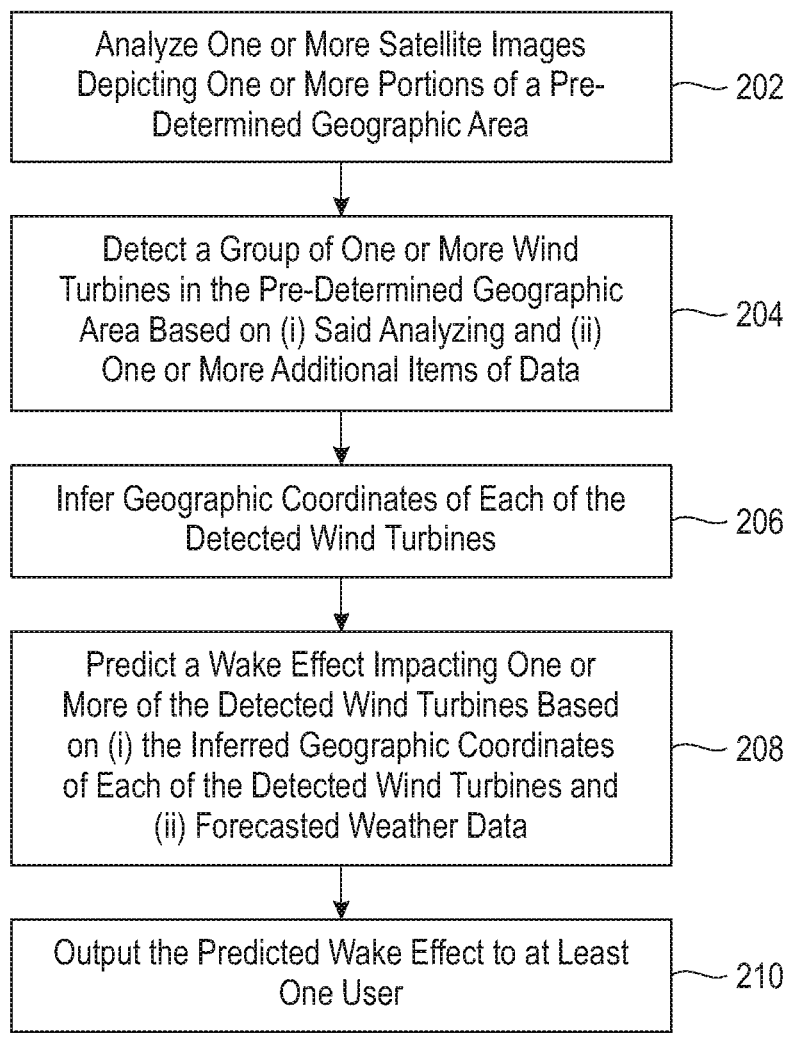
FIG. 2 is a flow diagram illustrating techniques according to an embodiment of the invention.

FIG. 2 is a flow diagram illustrating techniques according to an embodiment of the present invention. Step 202 includes analyzing one or more satellite images depicting one or more portions of a pre-determined geographic area. In one or more embodiments of the invention, the pre-determined geographic area is contained within a user-provided set of latitude and longitude coordinates. Additionally, the satellite images can include multiple satellite images recorded at different times of day.

At least one embodiment of the invention can also include automatically learning, based on the analyzing step, one or more patterns pertaining to spatial arrangements of wind turbines. Such an embodiment can additionally include identifying one or more anomalies in the one or more satellite images, in comparison to the one or more learned patterns.

Step 204 includes detecting a group of one or more wind turbines in the pre-determined geographic area based on (i) said analyzing and (ii) one or more additional items of data. The additional items of data can include one or more items of weather data, one or more items of land use data, and/or one or more items of street map data. Additionally, detecting can include segmenting a map of the pre-determined geographic area based on (i) land use data and (ii) meteorological data, and filtering satellite images corresponding to one or more segments of the map. Further, detecting can include implementing a high precision classifier to correctly detect at least one wind turbine, and implementing a high recall classifier across the remaining portions of the pre-determined geographic area to detect, based on the at least wind turbine detected by the high precision classifier, all turbines within the remaining portions of the pre-determined geographic area.

Step 206 includes inferring geographic coordinates of each of the detected wind turbines. The geographic coordinates can include a set of latitude and longitude coordinates for each of the detected wind turbines. Also, inferring can include mapping the detected wind turbines against one or more historical satellite images.

Step 208 includes predicting a wake effect impacting one or more of the detected wind turbines based on (i) the inferred geographic coordinates of each of the detected wind turbines and (ii) forecasted weather data. Predicting the wake effect can include predicting one or more times at which the predicted wake effect will impact the one or more detected wind turbines. Step 210 includes outputting the predicted wake effect to at least one user.

The techniques depicted in FIG. 2 can also include forecasting the location of one or more additional wind turbines in the pre-determined geographic area, wherein said forecasting is based on (i) the inferred geographic coordinates of each of the detected wind turbines and (ii) an objective of improved power output associated with wind turbines in the pre-determined geographic area. Further, at least one embodiment of the invention can include forecasting the power output associated with wind turbines in the pre-determined geographic area, wherein said forecasting is based on (i) the inferred geographic coordinates of each of the detected wind turbines and (ii) one or more weather data forecasts.

Also, an additional embodiment of the invention includes detecting a shadow corresponding to each of the detected wind turbines based on the analyzing step; inferring geographic coordinates of (i) each of the detected wind turbines and (ii) each of the detected shadows; and predicting a wake effect impacting one or more of the detected wind turbines based on (i) the inferred geographic coordinates of (a) each of the detected wind turbines and (b) each of the detected shadows, and (ii) forecasted weather data. Detecting shadows can include filtering the satellite images based on temporal proximity of the recording of each of the satellite images to midday of the day of the recording. Additionally, such a predicting step can include applying a distinct weight to (i) each of the detected wind turbines and (ii) each of the detected shadows.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives satellite images sent from a data source to the transmission server. The server can process the information, for example, based upon user-provided user preference information that is stored in memory on the server. Subsequently, an alert is generated containing asset coordinates and/or forecasts (such as wake loss predictions, for example). The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
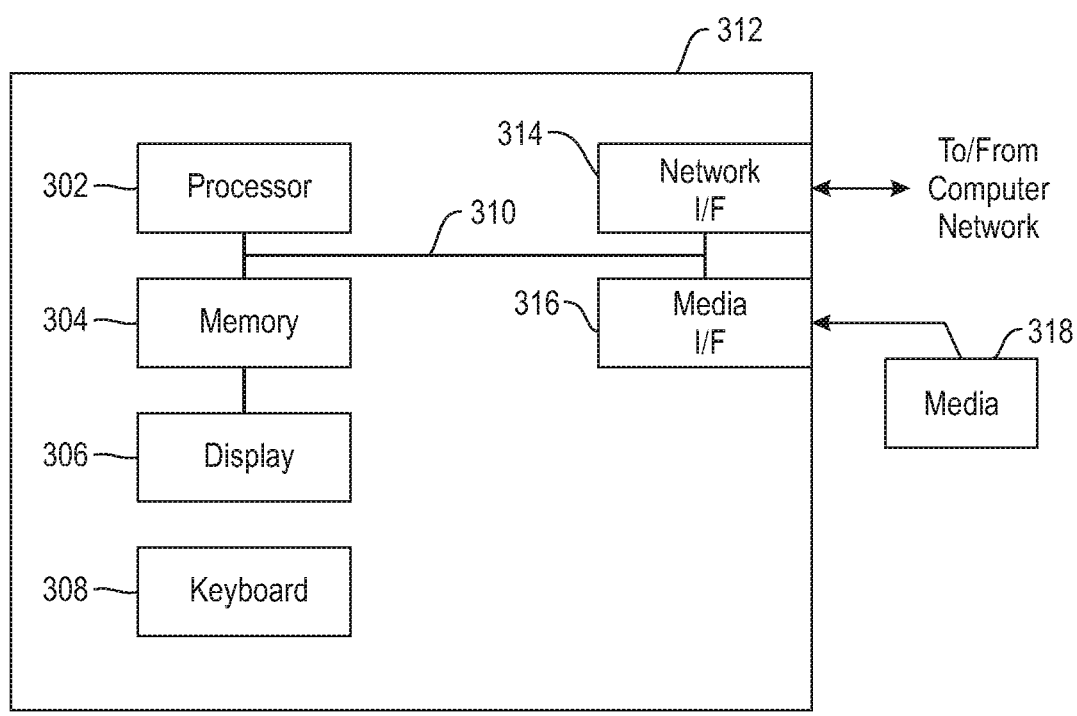
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
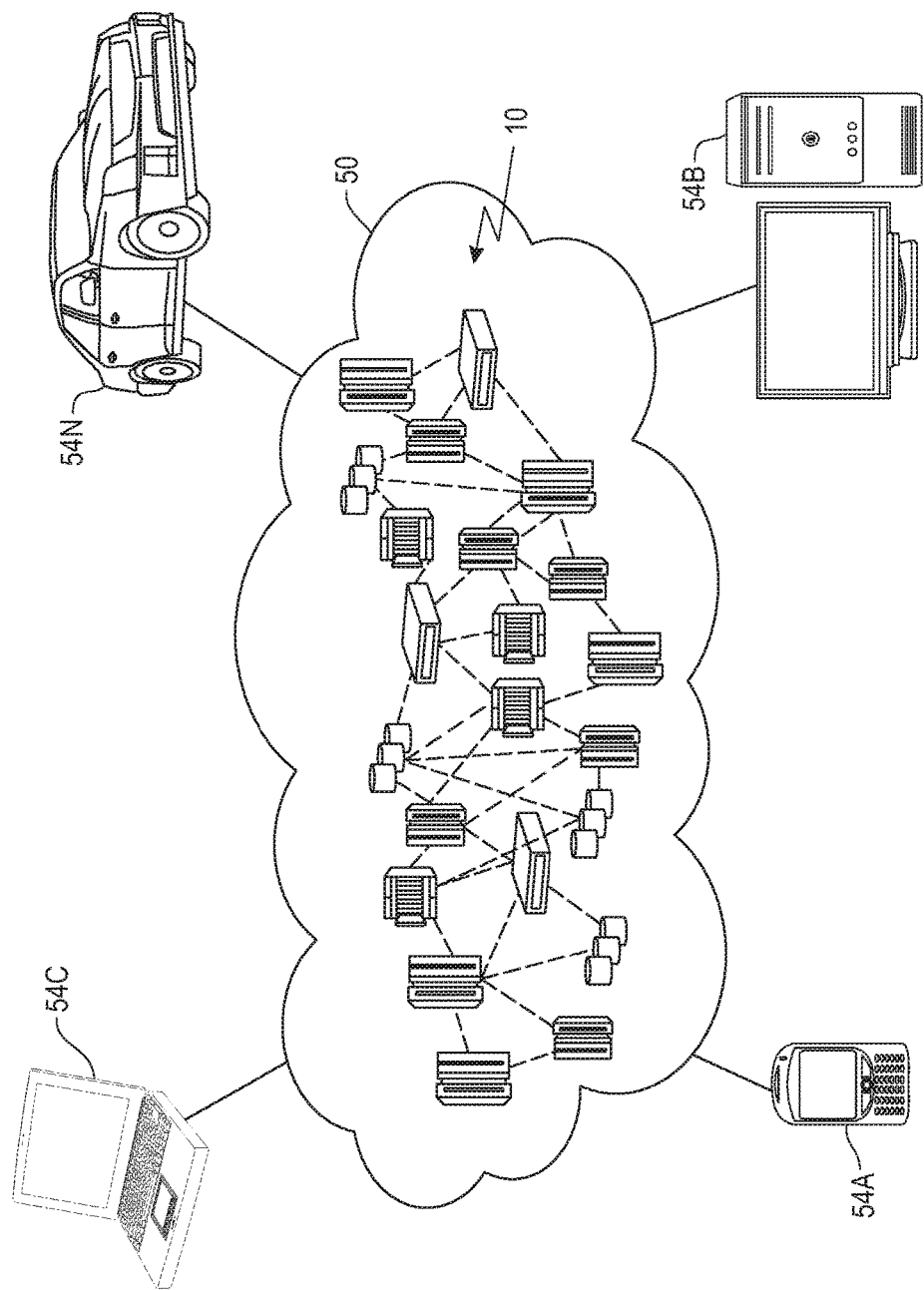
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
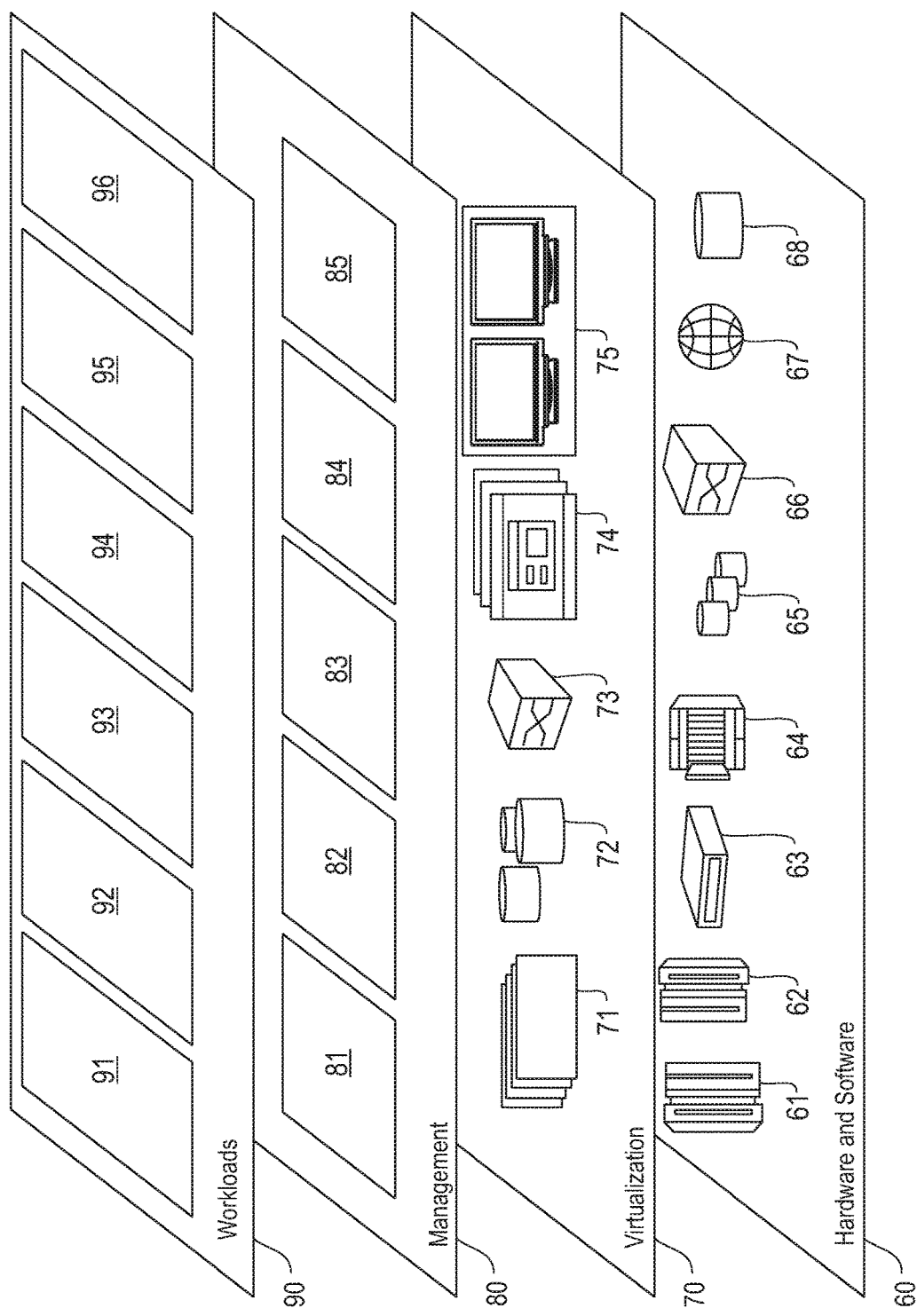
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and wake effect prediction 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, detecting solar panels and electrical transmission and/or distribution poles using satellite imagery, and forecasting the location of future wind farms to provide forecasts of power output.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for detecting wind turbines from satellite image data, the method comprising steps of:
    recording multiple satellite images;
    analyzing one or more of the multiple satellite images depicting one or more portions of a pre-determined geographic area;
    detecting a group of one or more wind turbines in the pre-determined geographic area based on (i) said analyzing and (ii) one or more additional items of data;
    inferring geographic coordinates of each of the detected wind turbines;
    predicting a wake effect impacting one or more of the detected wind turbines by (a) providing, as input to a wake model trained using images of wind turbines and images of shadows corresponding to wind turbines, (i) the inferred geographic coordinates of each of the detected wind turbines and (ii) forecasted weather data, and (b) generating, as an output of the wake model, one or more wake loss predictions; and
    outputting the predicted wake effect to at least one user;
    wherein the steps are carried out by at least one computing device.

2. The computer-implemented method of claim 1, wherein the pre-determined geographic area is contained within a user-provided set of latitude and longitude coordinates.

3. The computer-implemented method of claim 1, wherein the one or more satellite images comprise multiple satellite images recorded at different times of day.

4. The computer-implemented method of claim 1, wherein the one or more additional items of data comprise one or more items of weather data.

5. The computer-implemented method of claim 1, wherein the one or more additional items of data comprise one or more items of land use data.

6. The computer-implemented method of claim 1, wherein the one or more additional items of data comprise one or more items of street map data.

7. The computer-implemented method of claim 1, wherein said detecting comprises:
    segmenting a map of the pre-determined geographic area based on (i) land use data and (ii) meteorological data; and
    filtering satellite images corresponding to one or more segments of the map.

8. The computer-implemented method of claim 1, wherein said detecting comprises:
    implementing a high precision classifier to correctly detect at least one wind turbine; and
    implementing a high recall classifier across the remaining portions of the pre-determined geographic area to detect, based on the at least wind turbine detected by the high precision classifier, all turbines within the remaining portions of the pre-determined geographic area.

9. The computer-implemented method of claim 1, wherein the geographic coordinates comprise a set of latitude and longitude coordinates for each of the detected wind turbines.

10. The computer-implemented method of claim 1, wherein said inferring comprises mapping the detected wind turbines against one or more historical satellite images.

11. The computer-implemented method of claim 1, wherein said predicting the wake effect comprises predicting one or more times at which the predicted wake effect will impact the one or more detected wind turbines.

12. The computer-implemented method of claim 1, comprising:
    automatically learning, based on said analyzing, one or more patterns pertaining to spatial arrangements of the wind turbines.

13. The computer-implemented method of claim 12, comprising:
    identifying one or more anomalies in the one or more satellite images, in comparison to the one or more learned patterns.

14. The computer-implemented method of claim 1, comprising:
    forecasting the location of one or more additional wind turbines in the pre-determined geographic area, wherein said forecasting is based on (i) the inferred geographic coordinates of each of the detected wind turbines and (ii) an objective of improved power output associated with wind turbines in the pre-determined geographic area.

15. The computer-implemented method of claim 1, comprising:
    forecasting the power output associated with wind turbines in the pre-determined geographic area, wherein said forecasting is based on (i) the inferred geographic coordinates of each of the detected wind turbines and (ii) one or more weather data forecasts.

16. A computer program product comprising a computer readable storage medium having program instructions embodied therewith, the program instructions executable by a device to cause the device to:
    record multiple satellite images;
    analyze one or more of the multiple satellite images depicting one or more portions of a pre-determined geographic area;
    detect a group of one or more wind turbines in the pre-determined geographic area based on (i) said analyzing and (ii) one or more additional items of data;
    infer geographic coordinates of each of the detected wind turbines;
    predict a wake effect impacting one or more of the detected wind turbines by (a) providing, as input to a wake model trained using images of wind turbines and images of shadows corresponding to wind turbines, (i) the inferred geographic coordinates of each of the detected wind turbines and (ii) forecasted weather data, and (b) generating, as an output of the wake model, one or more wake loss predictions; and output the predicted wake effect to at least one user.

17. A system comprising:

a memory; and at least one processor operably coupled to the memory and configured for:

recording multiple satellite images;

analyzing one or more of the multiple satellite images depicting one or more portions of a pre-determined geographic area;

detecting a group of one or more wind turbines in the pre-determined geographic area based on (i) said analyzing and (ii) one or more additional items of data;

inferring geographic coordinates of each of the detected wind turbines;

predicting a wake effect impacting one or more of the detected wind turbines by (a) providing, as input to a wake model trained using images of wind turbines and images of shadows corresponding to wind turbines, (i) the inferred geographic coordinates of each of the detected wind turbines and (ii) forecasted weather data, and (b) generating, as an output of the wake model, one or more wake loss predictions; and outputting the predicted wake effect to at least one user.

18. A computer-implemented method for detecting wind turbines from satellite image data, the method comprising steps of:

recording multiple satellite images;

analyzing one or more of the multiple satellite images depicting one or more portions of a pre-determined geographic area;

detecting a group of one or more wind turbines in the pre-determined geographic area based on (i) said analyzing and (ii) one or more additional items of data;

detecting a shadow corresponding to each of the detected wind turbines based on said analyzing;

inferring geographic coordinates of (i) each of the detected wind turbines and (ii) each of the detected shadows;

predicting a wake effect impacting one or more of the detected wind turbines by (1) providing, as input to a wake model trained using images of wind turbines and images of shadows corresponding to wind turbines, (i) the inferred geographic coordinates of (a) each of the detected wind turbines and (b) each of the detected shadows, and (ii) forecasted weather data, and (2) generating, as an output of the wake model, one or more wake loss predictions; and outputting the predicted wake effect to at least one user;

wherein the steps are carried out by at least one computing device.

19. The computer-implemented method of claim 18, wherein said predicting a wake effect comprises applying a distinct weight to (i) each of the detected wind turbines and (ii) each of the detected shadows.

20. The computer-implemented method of claim 18, wherein said detecting a shadow corresponding to each of the detected wind turbines comprises filtering the satellite images based on temporal proximity of the recording of each of the satellite images to midday of the day of the recording.

* * * * *